(12) United States Patent
Shankar et al.

(10) Patent No.: US 7,525,952 B1
(45) Date of Patent: Apr. 28, 2009

(54) METHOD AND APPARATUS FOR DETERMINING THE SOURCE OF USER-PERCEIVED VOICE QUALITY DEGRADATION IN A NETWORK TELEPHONY ENVIRONMENT

(75) Inventors: Jagannathan Shiva Shankar, Bangalore (IN); Vishal Kumar Singh, Karnataka (IN); Muktevi Srinivas, Bangalore (IN); Rahul Mukherjee, Malleswaram Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1032 days.

(21) Appl. No.: 10/753,274

(22) Filed: Jan. 7, 2004

(51) Int. Cl.
*H04L 12/66* (2006.01)
*H04J 3/06* (2006.01)
*G10L 21/00* (2006.01)
*G10L 19/00* (2006.01)
*H04M 9/08* (2006.01)

(52) U.S. Cl. .................. 370/352; 370/516; 379/406.01; 379/406.08; 704/220; 704/270; 704/270.1

(58) Field of Classification Search .................. 704/270, 704/270.1, 220, 277; 370/241, 516, 272, 370/352, 412, 392, 389, 394, 503; 714/4; 705/1; 379/406.08, 406.01; 709/231; 381/94.1
See application file for complete search history.

(56) References Cited

U.S. PATENT DOCUMENTS

| | | | |
|---|---|---|---|
| 6,452,950 B1 * | 9/2002 | Ohlsson et al. | 370/516 |
| 6,760,323 B1 * | 7/2004 | Strandberg | 370/352 |
| 7,197,010 B1 * | 3/2007 | Berstein et al. | 370/252 |
| 7,359,979 B2 * | 4/2008 | Gentle et al. | 709/231 |
| 7,394,833 B2 * | 7/2008 | Heikkinen et al. | 370/516 |

(Continued)

FOREIGN PATENT DOCUMENTS

EP 1267555 A2 * 12/2002

OTHER PUBLICATIONS

Rix, A.W.; Beerends, J.G.; Hollier, M.P.; Hekstra, A.P, Perceptual evaluation of speech quality (PESQ)-a new method for speech quality assessment of telephone networks and codecs, vol. 2, May 7-11, 2001 pp. 749-752 vol. 2 http://ieeexplore.ieee.org/iel5/7486/20369/00941023.pdf?tp=&arnumber=941023&isnumber=20369.*

(Continued)

*Primary Examiner*—Thjuan K Addy
(74) *Attorney, Agent, or Firm*—Hickman Palermo Truong & Becker LLP (57) ABSTRACT

Techniques for finding the source of perceptual audio degradation in an IP telephony environment provide a hop-by-hop analysis of a network over which IP telephony is laid, and may be performed by network switching devices, such as routers, gateways and switches. Rather than monitoring packet loss, these techniques employ perceptual measures to determine the source of audio quality degradation in the network, as perceived by a user or caller. Generally, a reference waveform is systematically sent to intermediate network switching devices along the path between two endpoints. Each intermediate device sends back a return waveform that is based on the respective reference waveform received at each device. From comparing the reference waveform with the return waveform, for each round-trip along the path, the degradation of the audio quality is computed for each round-trip path, from which audio degradation is computed for each hop, from which the source of degradation is determined.

51 Claims, 4 Drawing Sheets

U.S. PATENT DOCUMENTS

| | | | | |
|---|---|---|---|---|
| 7,433,358 | B1* | 10/2008 | Volkaerts et al. | 370/394 |
| 2002/0051463 | A1* | 5/2002 | Higuchi | 370/466 |
| 2002/0141392 | A1* | 10/2002 | Tezuka et al. | 370/352 |
| 2002/0193999 | A1* | 12/2002 | Keane et al. | 704/270 |
| 2004/0042617 | A1* | 3/2004 | Beerends et al. | 379/416 |
| 2004/0078197 | A1* | 4/2004 | Beerends et al. | 704/225 |
| 2004/0090921 | A1* | 5/2004 | Russell Bennett | 370/241 |
| 2004/0136508 | A1* | 7/2004 | Reynolds | 379/88.18 |
| 2004/0153716 | A1* | 8/2004 | Baker | 714/4 |
| 2004/0165570 | A1* | 8/2004 | Lee | 370/349 |
| 2004/0249650 | A1* | 12/2004 | Freedman et al. | 705/1 |

OTHER PUBLICATIONS

Antony W. Rix, et al., "Perceptual Evaluation of Speech Quality (PESQ) The New ITU Standard for End-to-End Speech Quality Assessment Part 1—Time-Delay Compensation" Psytechnics Limited (formerly part of BT Laboratories), Ipswich IP1 1HN UK, Royal PTT Nederland NV, NL-2260 AK Leidschendam, The Netherlands, Oct. 2002, pp. 755-764.

John G. Beerends, et al., "Perceptual Evaluation of Speech Quality (PESQ) The New ITU Standard for End-to-End Speech Quality Assessment Part II—Psychoacoustic Model", Royal PTT Nederland NV, NL-2260 AK Leidschendam, The Netherlands, Psytechnics Limited (formerly part of BT Laboratories), Ipswich IP1 1HN UK, Oct. 2002, pp. 765-778.

Antony W. Rix, et al. "PESQ—The New Standard for End-to-End Speech Quality Assessment", BT Advanced Communications Research, B54/86 Adastral Park, Ipswich IP5 3RE, UK, Royal PTT Nederland NV, NL-2260 Leidschendam, The Netherlands, Sep. 2002, pp. 1-18.

Antony W. Rix, et al. "The Perceptual Analysis Measurement System for Robust End-to-End Speech Quality Assessment", BT Advanced Communications Research, MLB 3/7 pp3, Adastral Park, Ipswich IP5 3RE, UK, Jun. 2000, pp. 1-4.

* cited by examiner

METHOD AND APPARATUS FOR DETERMINING THE SOURCE OF USER-PERCEIVED VOICE QUALITY DEGRADATION IN A NETWORK TELEPHONY ENVIRONMENT

FIELD OF THE INVENTION

The present invention generally relates to communication networks. The invention relates more specifically to a method and apparatus for determining the source of user-perceived voice quality degradation in a network telephony environment.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Internet Protocol (IP) telephony is a technology that is being widely implemented and gaining widespread acceptance. However, transmitting voice over a network infrastructure that was developed and built for delay-insensitive applications, such as file transfers, poses various challenges. IP telephony systems do, at times, experience voice quality and performance problems. For example, jitter and latency are examples of common types of problems that are encountered with IP calls. Quality of Service (QoS) mechanisms are in place in modern network infrastructures which allow for allocation of priority to voice traffic, but a primary issue with IP telephony continues to be the quality of the voice received by a call participant.

Most applications that attempt to analyze the quality of voice over an IP telephony network consider latency and jitter, and compute a prediction of the level of degradation of voice quality. However, the predictions based on such parameters have limited value because, ultimately, voice quality is about a user's perception of the audible sounds being received in a call. Latency and jitter are useful metrics but they do not capture the perceived voice quality as experienced by a user.

Perceptual algorithms that are used to model the human ear are currently in existence. Such perceptual measures typically compute a number referred to as the Mean Opinion Score (MOS) that is used to categorize how the human ear perceives the voice quality. There are a number of techniques that are used to measure the perceptual voice quality, such as PESQ (Perceptual Evaluation of Speech Quality), PSQM (Perceptual Speech Quality Measurement) and PAMS (Perceptual Analysis Measurement System). However, each of these techniques operates on an end-to-end basis. A reference waveform signal is generated at one end of the network and transmitted to the other end and two waveforms, the reference waveform and the degraded waveform, are compared at the receiving endpoint to measure the degradation or distortion imparted to the signal by the network infrastructure.

The PESQ technique is described in a document entitled "Perceptual evaluation of speech quality (PESQ), an objective method for end-to-end speech quality assessment of narrowband telephone networks and speech codecs" (ITU-T Recommendation P.862), which is available from the International Telecommunication Union, and is hereby incorporated by reference in its entirety for all purposes as if fully set forth herein.

Since the foregoing techniques operate on an end-to-end basis, they are unable to determine a precise location within the network at which the speech degradation occurs, such as a specific hop or a specific component. Such techniques simply measure the perceptual degradation over the entire transmission path of the waveform signal. Hence, locating the true source of degradation remains a challenge and, consequently, actually eliminating the degradation remains an even bigger challenge. Therefore, valuable time and resources are expended in attempting to locate the degradation source and to fix the problem that is causing the degradation.

Based on the foregoing, there is a clear need for a technique for determining the source of perceptual speech degradation in an IP telephony environment.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for determining the source of user-perceived voice quality degradation in an IP telephony environment is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
      2.1 Operating Environment Example
   3.0 Determining Source of Audio Degradation in IP Telephony
      3.1 Originating Device
      3.2 Intermediate Network Device
   4.0 Implementation Mechanisms
      4.1 Hardware Overview
   5.0 Extensions and Alternatives 1.0 General Overview Techniques for finding the source of perceptual, i.e., user-perceived, audio degradation in an IP telephony environment, are described. These techniques provide a hop-by-hop analysis of a network over which IP telephony is laid, and may be performed by network devices, such as routers, gateways and switches. Rather than simply monitoring packet loss, these techniques employ perceptual measures to help determine the source of audio quality degradation in the network, as perceived by a user or caller. Hence, many influential factors are considered in computing a perceptual metric, such as effects of jitter, latency, network congestion, echo, RTP compression, transcoding, and the like.

Generally, a reference waveform, such as a .wav file, is systematically sent to intermediate network devices along the path between two endpoints, by an "originating device." The endpoints may be, for non-limiting examples, IP phones, synthetic phones or software executing on network endpoint devices. Each intermediate device, referred to herein as a "switching device," sends back a return or "degraded" waveform that is based on the respective reference waveform received at each device. From comparing the reference waveform with the return waveform, for each round-trip along the path, the degradation of the audio quality is computed for each round-trip path. From the round-trip information, audio degradation is computed for each hop. Hence, the source, such as a particular hop between and including two network routers, is determined based on the computed hop-by-hop audio degradation.

The switching devices to which the reference waveform is sent are operable in one of two modes: simple loop-back mode and buffered loop-back mode.

In simple loop-back mode, a switching device plays back the packets received from the originating device without processing them. In simple loop-back mode, the degradation that is computed is the average degradation along the path between the two endpoints because it collectively considers the path in each direction, with each path possibly being different due to QoS provisioning and processing or other factors.

In buffered loop-back mode, a switching device timestamps the packets received from the originating device and buffers the timestamped packets. When the complete stream is received, the switching device sends the packets back to the originating device, or a suitable proxy, over a reliable connection. One such reliable connection is a TCP connection. In buffered loop-back mode, the degradation that is computed is the one-way degradation from the originating device to the intermediate switching device, because the return waveform essentially is unaffected by the return path due to the bundling and transmission of the timestamped return packets over the reliable connection using retransmission of dropped packets.

In one embodiment, for each switching device of a set of switching devices that are configured between first and second endpoints, a reference file or waveform is transmitted to the switching device and a corresponding return file is received back from the switching device. Any degradation in the quality of the audio, such as speech, is computed for the path between the originating device and the switching device. Therefore, the source of any audio degradation in the path between two endpoints is determined based on the audio degradations computed in association with each switching device.

In one embodiment, from the viewpoint of an intermediate switching device, a reference file or waveform is received from an originating device. A return file is transmitted back to the originating device, for computing audio degradation that may have occurred in the path between the originating device and the switching device. According to the two operating modes described above, the switching device may operate in either simple loop-back mode or buffered loop-back mode.

The described processes can be automatically performed at specified times or after specified intervals of time, or may be performed in response to a user request.

2.0 Structural and Functional Overview 2.1 Operating Environment Example

Figure 1:
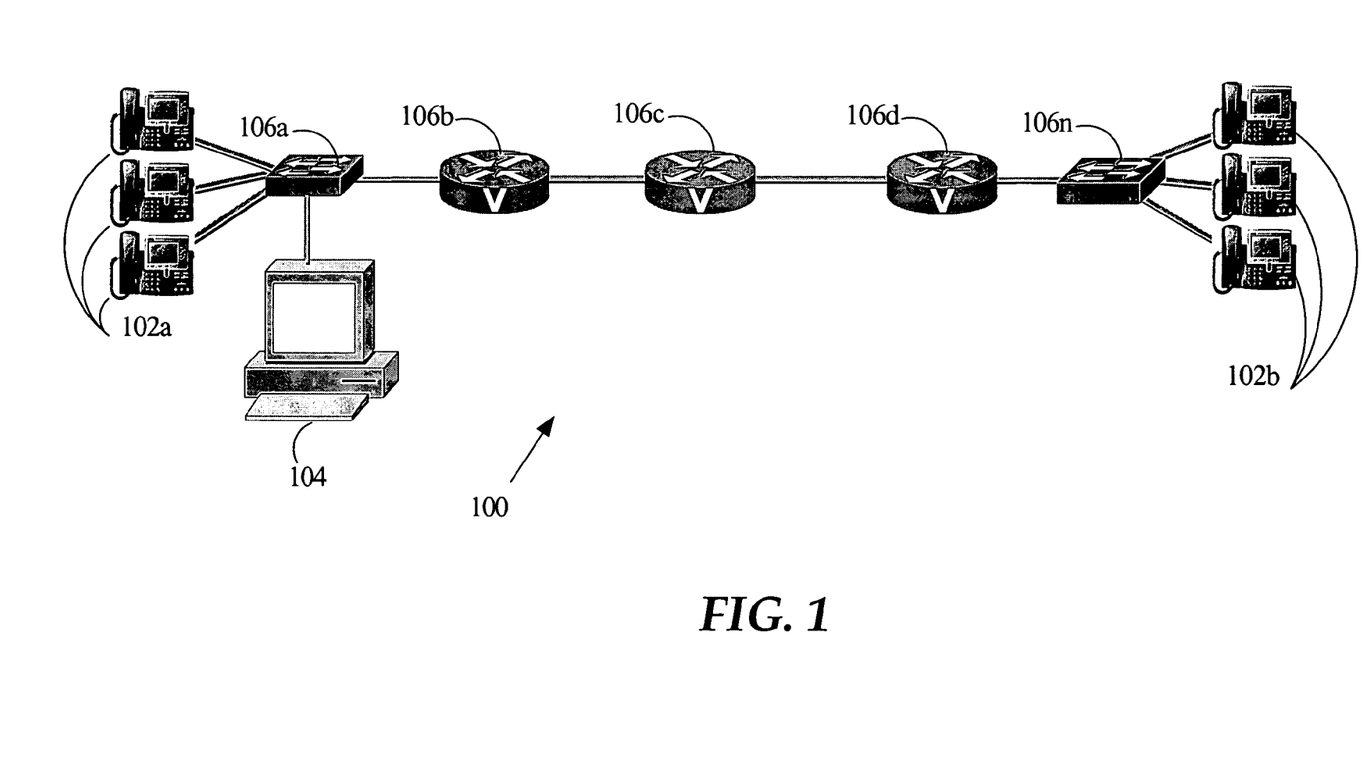
FIG. 1 is a block diagram of an example operating environment in which an embodiment may be implemented.

FIG. 1 is a block diagram that illustrates an example operating environment 100 in which an embodiment may be implemented. FIG. 1 illustrates one example of what is referred to herein as an IP telephony environment.

In environment 100, one or more phones 102a are communicatively coupled to one or more phones 102b through a series of network components constituting a network. For example, phones 102a, 102b are IP phones that communicate over a communications network, such as the public Internet and/or an enterprise LAN or WAN, using one or more IP telephony protocols. For another example, phones 102a, 102b are personal computers on which software executes to provide IP telephony services and functionality. Non-limiting examples of suitable communication protocols that are utilized by the phones 102a, 102b include ITU-T H.323, SIP (Session Initiation Protocol), MGCP (Media Gateway Control Protocol), SCCP (Signaling Connection Control Part), RTP/RTCP (Real-Time Transport Protocol/Real-Time Control Protocol).

The communications network may contain any number of network infrastructure elements including routers, switches, gateways, etc. For a non-limiting example, as illustrated in FIG. 1, the network that communicatively connects phone 102a to phone 102b includes gateways 106a, 106n and routers 106b, 106c, 106d. In one embodiment, the network is a TCP/IP network in which infrastructure elements execute a conventional routing protocol for routing packets among the infrastructure elements. Although embodiments are described herein with reference to the TCP/IP protocol, implementations are not limited to use of TCP/IP. Rather, other network communication protocols, including protocols that are not yet developed, may be used to implement these techniques.

Figure 2:
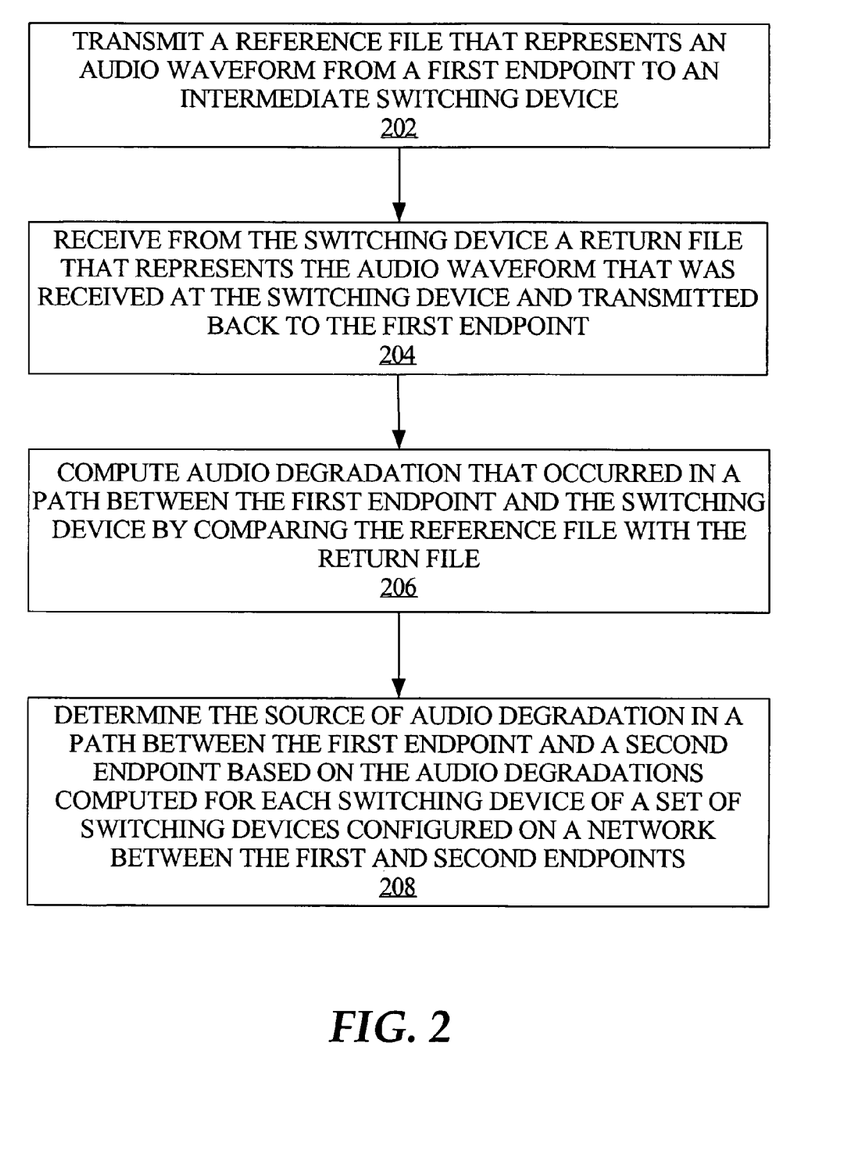
FIG. 2 is a flow diagram that illustrates a process for determining the source of audio degradation in an IP telephony environment.

Environment 100 further comprises a workstation 104, from which one or more processes that are described in reference to FIG. 2 may be performed. Workstation 104 is any suitable computing platform, such as computer system 400 of FIG. 4, that is capable of reading instructions and, through execution of such instructions, causing one or more processors to carry out steps as described in reference to FIG. 2. Furthermore, workstation 104 provides an interface for a user to initiate performance of or view results of one or more of the steps described in reference to FIG. 2 and FIG. 3.

3.0 Determining Source of Audio Degradation in IP Telephony 3.1 Originating Device FIG. 2 is a flow diagram that illustrates a process for determining the source of audio degradation in an IP telephony environment. The process illustrated in FIG. 2 may be performed by one or more processors executing instructions, such as by workstation 104, gateway 106a or routers 106b, 106c, 106d (FIG. 1). Although code for performing the process of FIG. 2 can be installed and executed on any network device with suitable processing means, the process is described as if being performed by the workstation 104 because workstation 104 is configured closest to call endpoints, IP phones 102a. Performing the process from a device near a call endpoint provides the maximum analytical coverage of the network between the endpoints. For description purposes, any of phones 102a is considered a first endpoint and any of phones 102b is considered a second endpoint.

Blocks 202, 204 and 206 are performed for each switching device of a set of switching devices that are configured on a network between a first endpoint and a second endpoint. For example, the referenced blocks are performed for each of gateway 106*a*, routers 106*b*, 106*c*, 106*d* and gateway 106*n*. The device that is performing the process of FIG. 2 is referred to herein as the "originating device." The term "switching device" and "intermediate switching devices" are used herein in reference to devices operating at the network or data link layers, i.e., layer 3 or layer 2, of the OSI (Open System Interconnection) reference model. For example, routers, switches and gateways are intermediate switching devices.

At block 202, a reference file is transmitted from an originating device to the switching device. The reference file represents an audio waveform, such as a .wav file. For example, a reference .wav file is transmitted from workstation 104 to gateway 106*a*. Any suitable network communication protocols may be used to transmit the reference file, such as RTP/RTCP over UDF/IP. In an embodiment, whatever relevant communication protocols are used with IP telephony applications over the network of interest are the protocols that are used to transmit the reference file.

In an embodiment, a particular loop-back port is defined on intermediate network devices, i.e., switching devices, to which the reference file is transmitted. In another embodiment, a handshake protocol is implemented to indicate to the switching devices that a loop-back test is imminent, to which a reply from a switching device may include identification of a particular port on which the device will listen for the reference file. Another approach may be to use a controlled, or out-of-band, reliable connection with switching devices to indicate that a loop-back test is imminent. Furthermore, according to an embodiment, in buffered loop-back mode, a TCP or other reliable connection between the originating device and respective switching devices is used to transmit a message from the originating device to the switching device to indicate that transmission of the reference file is complete.

In an embodiment, block 202 is performed for each switching device of the set of switching devices in a sequential order from a switching device that is nearest to the first endpoint to a switching device that is nearest to the second endpoint. Hence, a systematic hop-by-hop test is performed. For example, workstation 104 first transmits the reference file to gateway 106*a*, then to router 106*b*, then to router 106*c* and so on to gateway 106*n*.

At block 204, a return file is received from the respective switching device to which the reference file was sent at block 202. The return file represents the audio waveform of the reference file that was received at the switching device and transmitted back to the originating device. Therefore, the return file is a file that represents any degradation in the quality of the audio that has been imparted to the original audio waveform. The order in which the originating device receives the return files is not necessarily the same order in which corresponding reference files were transmitted.

If the switching device is operating in simple loop-back mode, as described above, then the return file represents degradation associated with both paths of the round-trip path between the originating device and the respective switching device. If the switching device is operating in buffered loop-back mode, as described above, then the return file represents degradation associated only with the path from the originating device to the respective switching device. This is because the return file is sent back to the originating device, where the packets are re-sequenced based on the timestamps, over a reliable connection without changing what was received. Therefore, the return file is essentially unaffected by the return path. Note that the outbound path may differ from the return path, due to QoS processing, for example.

At block 206, the audio degradation, if any, that occurred in a path between the originating device and the respective switching device is computed by at least comparing the reference file with the return file. Thus, block 206 computes a hop-by-hop audio degradation for each hop between successive switching devices of the set of switching devices. For example, having results, such as a MOS, associated with paths 106*a*-to-106*b* and 106*a*-to-106*b*-to-106*c* provides enough information to compute the degradation for the hop 106*b*-to-106*c*.

Performance of blocks 202-206 does not necessarily occur in that order for each sequential switching device. In other words, the process is not limited to applying blocks 202-206 for a first switching device, then applying block 202-206 to the next switching device, and so on. Hence, block 206 may be performed in relation to a first switching device, such as 106*a* (FIG. 1), substantially concurrently with blocks 202 and 204 being performed in relation to a second switching device, such as 106*b* (FIG. 1) because the hop degradation is computable once the return file is received for a given hop.

In an embodiment, the step of computing audio degradation at block 206 comprises using a perceptual measure or algorithm to compute user-perceived speech degradation. In an embodiment, the perceptual measure employed to compute the degradation for each hop is PESQ, which is described in the previously referenced ITU-T Recommendation P.862. For example, workstation 104 may execute an application that embodies the PESQ methods, and apply such methods in analysis of the reference and return files, thereby obtaining a MOS score for each hop along the path between the two endpoints. Additionally, jitter, latency and packet loss for each hop are measurable using the techniques described.

Hence, rather than simply monitoring packet loss, the described techniques employ perceptual measures to determine the source of audio quality degradation in the network, as perceived by a user or caller. Consequently, other influential factors are considered in computing a perceptual metric, such as a combination of effects of jitter, delay, congestion, echo, RTP compression, transcoding, and the like. Use of perceptual measures overcomes the notion that the human ear, as well as different linguistic behaviors, will cause the degradation to manifest itself differently in different languages, which cannot be accounted for with simple packet loss measurements.

In an embodiment, the set of switching devices comprises every switching device along respective transmission paths between the first endpoint and the second endpoint. In another embodiment, the set of switching devices comprises a subset of the switching devices along respective transmission paths between the first endpoint and the second endpoint. For example, one might implement the techniques described by testing a subset of transmission paths between the endpoints, where a successive paths may skip one or more switching devices. For example, the path 106*a*-to-106*c* is tested and the path 106*a*-to-106*n* is tested and if any degradation is computed for either of the paths, then each hop within the path showing degradation is tested.

At block 208, the source of audio degradation in a path between the first endpoint, such as phone 102*a*, and the second endpoint, such as phone 102*b*, is determined. Such a determination is based on the respective audio degradations computed at block 206 for each hop along the path. For example, a specific hop may be identified as imparting significant degradation to the audio quality, based on the MOS computed for that hop. Thus, knowing that a specific hop is degrading the audio quality, the two network devices that are endpoints with respect to the specific hop, as well as any interconnecting infrastructure, can be further analyzed in an attempt to identify and solve the problem. For a non-limiting example, knowing that a given hop has an unacceptable MOS might lead a network administrator to investigate the echo cancellation, call admission control and/or QOS implementations at a digital-analog interface that is associated with the given hop.

In an embodiment, an optional step is performed by determining the set of network switching devices that are configured on a network between the first and second endpoints. Since the communication path from the first endpoint to the second endpoint may differ from the communication path from the second endpoint to the first endpoint, in one embodiment, a set of switching devices that are in a path from the first endpoint to the second endpoint is determined. In a related embodiment, a set of switching devices that are in a path from the second endpoint to the first endpoint is determined.

One approach to determining the devices configured between two network points may be to use a modified traceroute routine that determines all network switching devices on the path, for example, a routine based on transmission of RTP packets. For example, RTP packets with different SSRC value than normal RTP packets and with special RTP payload type or with IETF RFC 2833-style NSE/NTE may be used to cause a receiving system to "pong" the packet if it supports that special RTP payload type or NSE/NTE, or to drop the packet if it does not support that special RTP payload type (or NSE/NTE). As with normal traceroute, packets are sent with increasing IP TTL values which cause intermediate network switching devices to send back an ICMP "time exceeded" error code when they decrement TTL to 0.

Another approach may be to define a new message as a part of the RSVP protocol (Resource ReSerVation protocol; see IETF RFC 2205). The RSVP protocol type is set to a value of 0 (zero), with the remaining fields like a typical Reservation request. When any of the intermediate devices, such as routers and gateways, in the path receive the RSVP message, such devices do not maintain any soft state. Rather, the intermediate device sends out a syslog message to a configured syslog server, where the syslog message comprises the following fields: (1) address of the originator of the RSVP request; (2) address of the node that is responding to the RSVP request; (3) TTL of the received packet at the node; and (4) additional call data that is included as a new object class. In addition, the endpoint would send a syslog message at the beginning of the call, which contains data that is a part of the additional call data in the RSVP message, where the additional call data could include: (1) sender phone DN and IP address; (2) destination phone DN and IP address; and (3) call server that is processing the call signaling. Thus, when the syslog messages are received at the syslog server, it is straightforward to look at the syslog message from the phone and associate it with the corresponding RSVP syslog messages by looking at the call data, and the TTL information will indicate the topology or order in which the message was received.

The process of FIG. 2 is described as being performed in one direction, such as from workstation 104 to any of the intermediate switching devices 106a-106n (FIG. 1). However, in embodiments in which the code that is executed to perform the process is installed on each of the switching devices, the process may be performed in both directions. For example, the process may be performed by workstation 104 to measure degradation in the path to switching device 106c and by switching device 106c to measure degradation in the path from switching device 106c to workstation 104.

3.2 Intermediate Network Device

Figure 3:
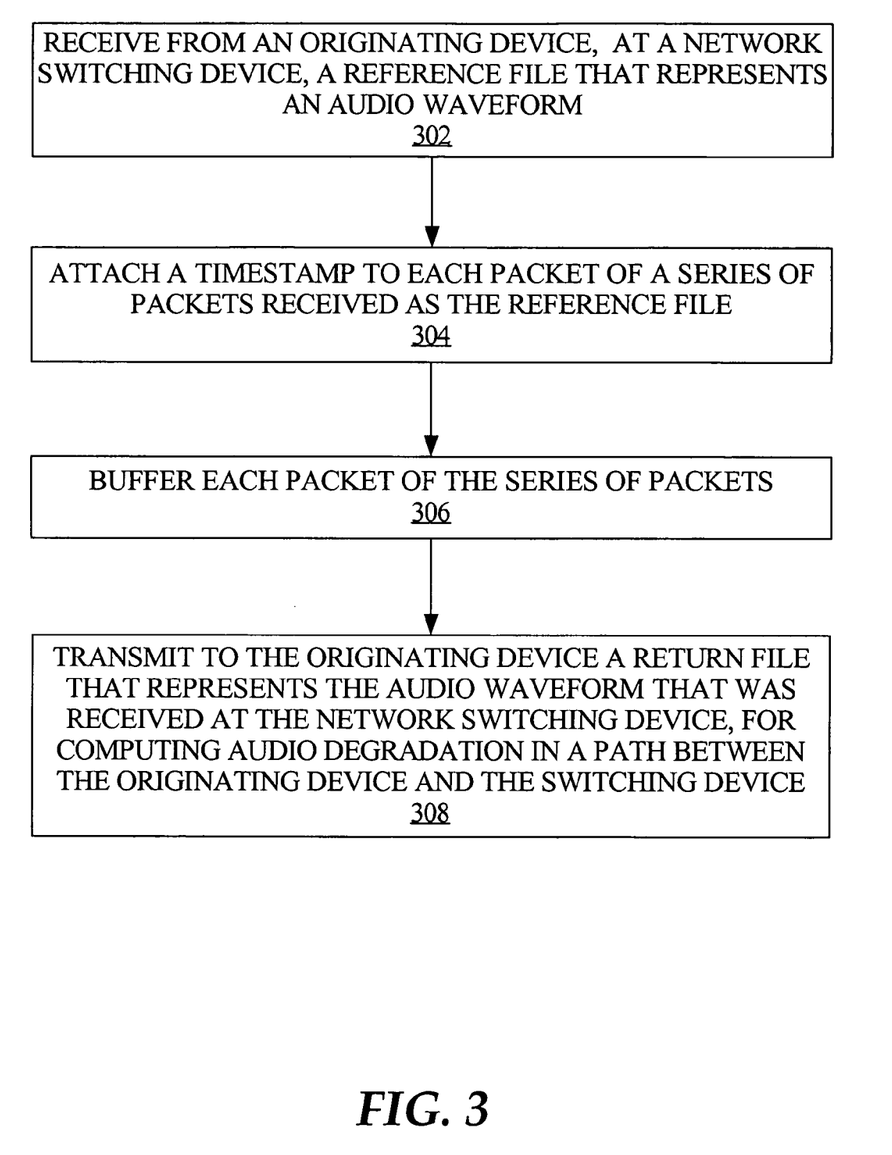
FIG. 3 is a flow diagram that illustrates a process for determining audio degradation in a path of an IP telephony environment.

FIG. 3 is a flow diagram that illustrates a process for determining audio degradation in a path of an IP telephony environment. The process illustrated in FIG. 3 may be performed by one or more processors executing instructions on a switching device, such as gateways 106a, 106n and/or routers 106b, 106c, 106d (FIG. 1). As mentioned, the term "switching device" is used herein to refer to intermediate network devices.

At block 302, a reference file is received, from an originating device, that represents an audio waveform. For example, router 106b receives, from workstation 104, a series of RTP packets that comprise a standard reference .wav file.

Blocks 304 and 306 are optional blocks, which are performed if the switching device is operating in buffered loop-back mode. At block 304, a timestamp is attached to each packet of a series of packets received at block 302, which comprise the reference audio file. At block 304, each timestamped packet is buffered. The switching device keeps receiving such packets until the complete series of packets is received. In an embodiment, a TCP or other reliable connection between the originating device and respective switching devices is used to indicate to the switching device that transmission of the reference file is complete. However, other suitable methods may be used to indicate to the switching device that the end of the file has been received.

At block 308, a return file is transmitted from the switching device to the originating device, or a suitable proxy, for computing any audio degradation that may have occurred in the path between the originating device and the switching device. As mentioned, in buffered loop-back mode, which includes blocks 304 and 306, the return file is transmitted back to the originating device over a reliable connection so that it is relatively unaffected by the return path. An example of a reliable connection is a TCP connection, over which a "bundled" return file is transmitted, from which the timestamped packets can be re-sequenced by the originating device to reflect the reference file that was received by the switching device in the form in which it was received. Transmission of the return file may employ FTP or HTTP, for example, layered over the TCP connection, for retransmission of lost or dropped packets. Hence, in buffered loop-back mode, the computed degradation is computed for the path from the originating device to the respective switching device. By contrast, in simple loop-back mode, blocks 304 and 306 are not performed and the degradation is computed as an average of both paths of the round-trip, i.e., from originating device to switching device and from switching device to originating device.

4.0 Implementation Mechanisms

The following implementation mechanisms are non-limiting examples, which are related to a specific implementation. However, details may vary from implementation to implementation. Hence, the following sections are not to be construed to limit use of embodiments of the invention.

4.1 Hardware Overview

Figure 4:
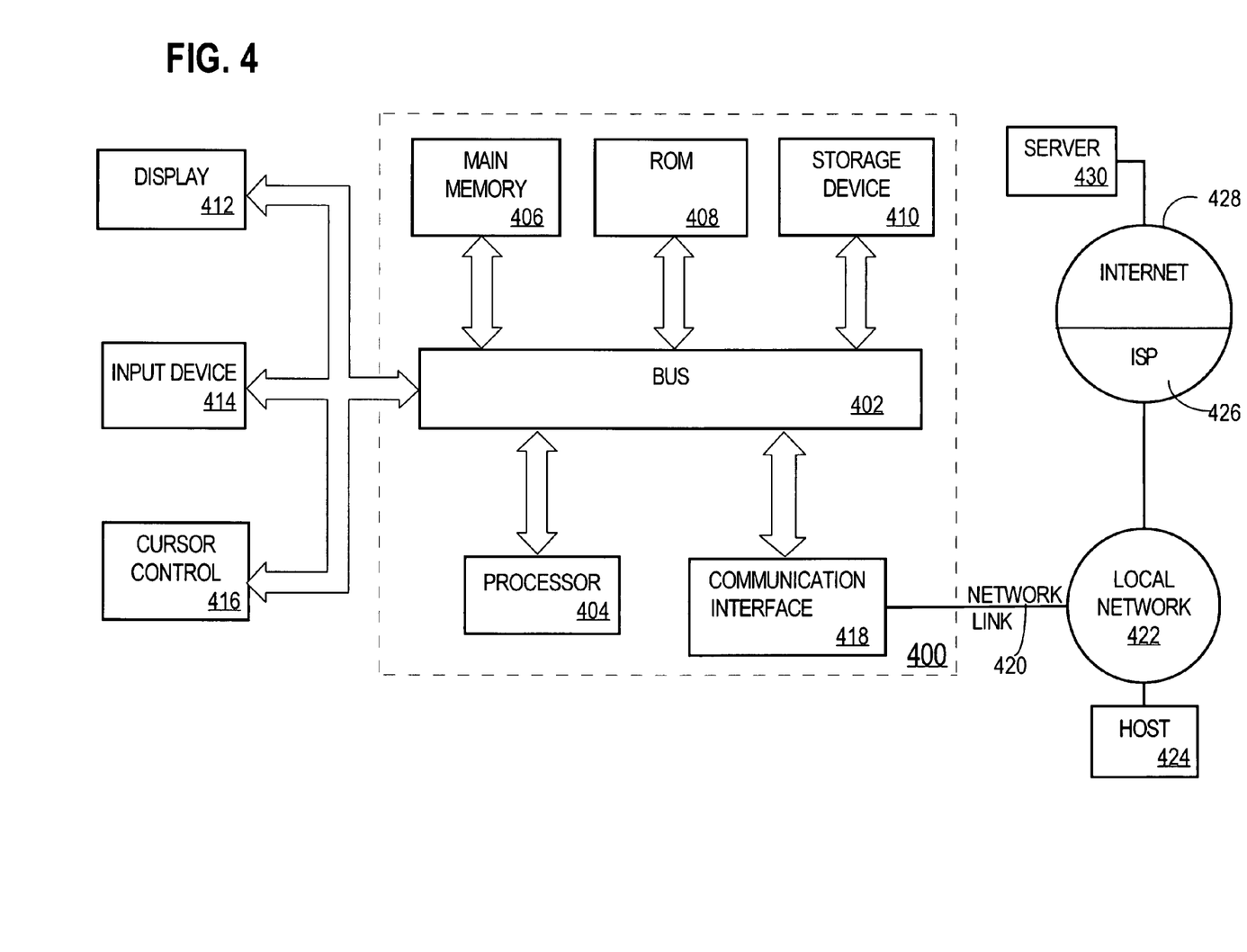
FIG. 4 is a block diagram that illustrates a computer system upon which embodiments may be implemented.

FIG. 4 is a block diagram that illustrates a computer system 400 upon which an embodiment of the invention may be implemented. The process of FIG. 2 may be performed by a system such as computer system 400. Hence, according to that aspect, the process is performed by a network-connected device, for example, by a workstation, gateway or router configured similarly to computer system 400. However, all of the components illustrated as computer system 400 may not be necessary to perform the process of FIG. 2. The process of FIG. 3 may be performed by a system such as computer system 400. Hence, according to that aspect, the process is performed by an intermediate network device configured similarly to computer system 400. However, all of the components illustrated as computer system 400 may not be necessary to perform the process of FIG. 3.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk or magneto-optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any storage medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, and volatile media. Non-volatile media includes, for example, optical, magnetic or magneto-optical disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for determining the source of audio signal degradation in an Internet Protocol (IP) telephony environment, the method comprising the computer-implemented steps of:

for each switching device of a plurality of switching devices that are configured on a network along a path between a first endpoint and a second endpoint,
storing a reference version of an audio signal waveform at an originating device;
transmitting, from the originating device to the switching device, the reference version of the audio signal waveform;
receiving at the originating device from the switching device a second version of the audio signal waveform that represents the waveform after transmission at least to the switching device;
computing at the originating device audio signal degradation that occurred between the originating device and the switching device by comparing the reference version of the audio signal waveform with the second version of the reference version of the audio signal waveform;
determining which switching device along the path between the first endpoint and the second endpoint is the source of audio signal degradation based on the audio signal degradations associated with each of the switching devices of the switching devices; and
storing an identifier of the source of audio signal degradation.

2. The method of claim 1, wherein the step of computing audio signal degradation includes computing audio signal degradation with a perceptual measure.

3. The method of claim 1, wherein the step of computing audio signal degradation includes computing audio signal degradation using Perceptual Evaluation of Speech Quality (PESQ) techniques.

4. The method of claim 1,
wherein the step of receiving includes receiving the second version of the audio signal waveform over a reliable Transmission Control Protocol (TCP) connection after the switching device timestamps packets that it received that correspond with the reference version of the audio signal waveform that was transmitted by the originating device and buffers the packets before sending them to the originating device over the reliable TCP connection; and
wherein the step of computing the audio signal degradation consists of computing the audio signal degradation that occurred in a path from the originating device to the switching device.

5. The method of claim 1,
wherein the step of receiving includes receiving the second version of the audio signal waveform at the originating device from the switching device; and
wherein the step of computing the audio signal degradation consists of computing the audio signal degradation that occurred in a round-trip path between the originating device and the switching device.

6. The method of claim 1,
wherein the step of receiving includes receiving the second version of the audio signal waveform at the switching device; and
wherein the step of computing includes computing the audio signal degradation at the switching device.

7. The method of claim 6, further comprising the computer-implemented step of:
for each switching device of a set of switching devices, receiving from the switching device a measure of the audio signal degradation that was computed at the switching device.

8. The method of claim 1, further comprising the computer-implemented step of:
determining the set of network switching devices that are configured on the network between the first endpoint and the second endpoint.

9. The method of claim 1, further comprising the computer-implemented step of:
determining the set of network switching devices that are configured on the network between the first endpoint and the second endpoint by determining a set of network switching devices that are in a path from the first endpoint to the second endpoint.

10. The method of claim 9, further comprising the computer-implemented step of:
determining the set of network switching devices that are configured on the network between the first endpoint and the second endpoint by determining the set of network switching devices that are configured in a path from the second endpoint to the first endpoint.

11. The method of claim 10, wherein the path from the first endpoint to the second endpoint is different than the path from the second endpoint to the first endpoint.

12. The method of claim 1, wherein the set of switching devices comprises every switching device configured on a path between the first endpoint and the second endpoint.

13. The method of claim 1, wherein the set of switching devices comprises a subset of the switching devices configured on a path between the first endpoint and the second endpoint.

14. The method of claim 1, wherein the step of transmitting is performed for each switching device of the set of switching devices in a sequential order from a switching device that is nearest to the first endpoint to a switching device is that is nearest to the second endpoint.

15. The method of claim 1, wherein the steps are performed by one or more intermediate network switching devices.

16. The method of claim 1, wherein the steps are performed by one or more network routers.

17. A method for determining audio signal degradation in a path of an Internet Protocol (IP) telephony environment, the method comprising the computer-implemented steps of:

at a network switching device of a plurality of switching devices that are configured on a network along a path between a first endpoint and a second endpoint,
receiving from an originating device connected to the network, a reference version of an audio signal waveform; and
transmitting to the originating device a second version of the reference version of the audio signal waveform that represents the audio signal waveform after transmission at least to the network switching device, for computing audio signal degradation that occurred in a path between the originating device and the network switching device by comparing the reference version of the audio signal waveform with the second version of the reference version of the audio signal waveform, and for determining whether the network switching device along the path between the first endpoint and the second endpoint is the source of the audio signal degradation.

18. The method of claim 17, wherein the steps are performed by an intermediate network switching device.

19. The method of claim 17, wherein the steps are performed by a network router.

20. The method of claim 17, wherein the reference version of the audio signal waveform is received as a series of packets, the method further comprising the computer-implemented steps of:
- attaching a timestamp to each of the packets of the series of packets;
- buffering each of the packets of the series of packets;
- wherein the step of transmitting comprises, upon receiving the complete series of packets that represent the reference version of the audio signal waveform, transmitting the second version of the reference version of the audio signal waveform to the originating device over a reliable Transmission Control Protocol (TCP) connection, for computing the audio signal degradation that occurred in a path from the originating device to the switching device.

21. The method of claim 20, wherein the steps are performed by an intermediate network switching device.

22. The method of claim 20, wherein the steps are performed by a network router.

23. A computer-readable storage medium storing one or more sequences of instructions for determining the source of audio signal degradation in an Internet Protocol (IP) telephony environment, which instructions, when executed by one or more processors, cause the one or more processors to carry out the steps of:
- for each switching device of a plurality of switching devices that are configured on a network along a path between a first endpoint and a second endpoint,
  - transmitting, from an originating device to the switching device, a reference version of an audio signal waveform;
  - receiving a second version of the reference version of the audio signal waveform that represents the waveform after transmission at least to the switching device;
  - computing audio signal degradation that occurred between the originating device and the switching device by comparing the reference version of the audio signal waveform with the second version of the reference version of the audio signal waveform; and
- determining which switching device along the path between the first endpoint and the second endpoint is the source of audio signal degradation based on the audio signal degradations associated with each of the switching devices of the switching devices.

24. The computer-readable storage medium of claim 23, wherein the instructions cause the one or more processors to carry out the step of computing audio signal degradation by computing audio signal degradation with a perceptual measure.

25. The computer-readable storage medium of claim 23, wherein the instructions cause the one or more processors to carry out the step of computing audio signal degradation by computing audio signal degradation using Perceptual Evaluation of Speech Quality (PESQ) techniques.

26. The computer-readable storage medium of claim 23, wherein the instructions cause the one or more processors to carry out the step of receiving by receiving the second version of the reference version of the audio signal waveform at the originating device from the switching device.

27. The computer-readable storage medium of claim 26, wherein the instructions cause the one or more processors to carry out
- the step of receiving by receiving the second version of the reference version of the audio signal waveform over a reliable Transmission Control Protocol (TCP) connection after the switching device timestamps packets that it received that correspond with the reference version of the audio signal waveform that was transmitted by the originating device and buffers the packets before sending them to the originating device over the reliable TCP connection; and
- the step of computing the audio signal degradation by computing the audio signal degradation that occurred in a path from the originating device to the switching device.

28. The computer-readable storage medium of claim 23, wherein the instructions cause the one or more processors to carry out
- the step of receiving the second version of the reference version of the audio signal waveform at the originating device from the switching device; and
- the step of computing the audio signal degradation by computing the audio signal degradation that occurred in a round-trip path between the originating device and the switching device.

29. The computer-readable storage medium of claim 23, wherein the instructions cause the one or more processors to carry out
- the step of receiving the second version of the reference version of the audio signal waveform at the switching device; and
- the step of computing by computing the audio signal degradation at the switching device.

30. The computer-readable storage medium of claim 29, wherein the instructions cause the one or more processors to carry out:
- for each switching device of a set of switching devices, receiving from the switching device a measure of the audio signal degradation that was computed at the switching device.

31. The computer-readable storage medium of claim 23, wherein the instructions cause the one or more processors to carry out:
- determining the set of network switching devices that are configured on the network between the first endpoint and the second endpoint.

32. The computer-readable storage medium of claim 23, wherein the instructions cause the one or more processors to carry out:
- determining the set of network switching devices that are configured on the network between the first endpoint and the second endpoint by determining a set of network switching devices that are in a path from the first endpoint to the second endpoint.

33. The computer-readable storage medium of claim 32, wherein the instructions cause the one or more processors to carry out:
- determining the set of network switching devices that are configured on the network between the first endpoint and the second endpoint by determining the set of network switching devices that are configured in a path from the second endpoint to the first endpoint.

34. The computer-readable storage medium of claim 33, wherein the path from the first endpoint to the second endpoint is different than the path from the second endpoint to the first endpoint.

35. The computer-readable storage medium of claim 23, wherein the set of switching devices comprises every switching device configured on a path between the first endpoint and the second endpoint.

36. The computer-readable storage medium of claim 23, wherein the set of switching devices comprises a subset of the switching devices configured on a path between the first endpoint and the second endpoint.

37. The computer-readable storage medium of claim 23, wherein the instruction cause the one or more processors to carry out the step of transmitting by transmitting to each switching device of the set of switching devices in a sequential order from a switching device that is nearest to the first endpoint to a switching device is that is nearest to the second endpoint.

38. The computer-readable storage medium of claim 23, wherein the steps are performed by one or more intermediate network switching devices.

39. The computer-readable storage medium of claim 23, wherein the steps are performed by one or more network routers.

40. A computer-readable storage medium storing one or more sequences of instructions for determining audio signal degradation in a path of an Internet Protocol (IP) telephony environment, which instructions, when executed by one or more processors, cause the one or more processors to carry out the steps of:
    at a network switching device of a plurality of switching devices that are configured on a network along a path between a first endpoint and a second endpoint,
        receiving from an originating device connected to the network, a reference version of an audio signal waveform; and
        transmitting to the originating device a second version of the reference version of the audio signal waveform that represents the audio signal waveform after transmission at least to the network switching device, for computing audio signal degradation that occurred in a path between the originating device and the network switching device by comparing the reference version of the audio signal waveform with the second version of the reference version of the audio signal waveform, and for determining whether the network switching device along the path between the first endpoint and the second endpoint is the source of the audio signal degradation.

41. The computer-readable storage medium of claim 40, wherein the steps are performed by one or more processors configured on an intermediate network switching device.

42. The computer-readable storage medium of claim 40, wherein the steps are performed by one or more processors configured on a network router.

43. The computer-readable storage medium of claim 40, wherein the reference file is received as a series of packets, and wherein the instructions cause the one or more processors to carry out the steps of:
    attaching a timestamp to each of the packets of the series of packets;
    buffering each of the packets of the series of packets;
    wherein the step of transmitting comprises, upon receiving the complete series of packets that represent the reference version of an audio signal waveform, transmitting the second version of the reference version of the audio signal waveform to the originating device over a reliable Transmission Control Protocol (TCP) connection, for computing the audio signal degradation that occurred in a path from the originating device to the switching device.

44. The computer-readable storage medium of claim 43, wherein the steps are performed by one or more processors configured on an intermediate network switching device.

45. The computer-readable storage medium of claim 43, wherein the steps are performed by one or more processors configured on a network router.

46. A system for determining the source of audio signal degradation in an Internet Protocol (IP) telephony environment, the system comprising:
    means for transmitting a reference version of an audio signal waveform from an originating device to each switching device of a set of switching devices that are configured on a network between a first endpoint and a second endpoint;
    means for receiving a second version of the reference version of the audio signal waveform that represents the waveform after transmission at least to each respective switching device of a plurality of switching devices that are configured on a network along a path between a first endpoint and a second endpoint;
    means for computing audio signal degradation that occurred between the originating device and each switching device of the set of switching devices by comparing the reference version of the audio signal waveform with the second version of the reference version of the audio signal waveform; and
    means for determining which switching device along the path between the first endpoint and the second endpoint is the source of audio signal degradation based on the audio signal degradations associated with each of the switching devices of the switching devices.

47. The system of claim 46, wherein the system is configured on a network router.

48. A system for determining audio signal degradation in a path of an Internet Protocol (IP) telephony environment, the system comprising:
    at a network switching device of a plurality of switching devices that are configured on a network along a path between a first endpoint and a second endpoint,
        means for receiving from an originating device connected to the network, a reference version of an audio signal waveform; and
        means for transmitting to the originating device a second version of the reference version of the audio signal waveform that represents the audio signal waveform after transmission at least to the network switching device, for computing audio signal degradation that occurred in a path between the originating device and the network switching device by comparing the reference version of the audio signal waveform with the second version of the reference version of the audio signal waveform, and for determining whether the network switching device along the path between the first endpoint and the second endpoint is the source of the audio signal degradation.

49. The system of claim 48, wherein the system is configured on a network router.

50. A network device that can determine the source of audio signal degradation in an Internet Protocol (IP) telephony environment, the device comprising:

a network interface;
a processor coupled to the network interface and receiving messages from a network through the network interface;
a computer-readable storage medium storing one or more stored sequences of instructions which, when executed by the processor, cause the processor to carry out the steps of:
  for each switching device of a plurality of switching devices that are configured on a network along a path between a first endpoint and a second endpoint,
    storing a reference version of an audio signal waveform at an originating device;
    transmitting, from the originating device to the switching device, the reference version of the audio signal waveform;
    receiving a second version of the reference version of the audio signal waveform that represents the waveform after transmission at least to the switching device;
    computing audio signal degradation that occurred between the originating device and the switching device by comparing the reference version of the audio signal waveform with the second version of the reference version of the audio signal waveform;
    determining which switching device along the path between the first endpoint and the second endpoint is the source of audio signal degradation based on the audio signal degradations associated with each of the switching devices of the switching devices; and
  storing an identifier of the source of audio signal degradation.

51. A network device that can determine audio signal degradation in a path of an Internet Protocol (IP) telephony environment, the device comprising:
  a network interface;
  a processor coupled to the network interface and receiving messages from a network through the network interface;
  a computer-readable storage medium storing one or more stored sequences of instructions which, when executed by the processor, cause the processor to carry out the steps of:
    at a network switching device of a plurality of switching devices that are configured on a network along a path between a first endpoint and a second endpoint,
      receiving from an originating device connected to the network, a reference version of an audio signal waveform; and
      transmitting to the originating device a second version of the reference version of the audio signal waveform that represents the audio signal waveform after transmission at least to the network switching device, for computing audio signal degradation that occurred in a path between the originating device and the network switching device by comparing the reference version of the audio signal waveform with the second version of the reference version of the audio signal waveform, and for determining whether the network switching device along the path between the first endpoint and the second endpoint is the source of the audio signal degradation.

* * * * *